US012755193B2

(12) United States Patent
Gullapudi et al.

(10) Patent No.: US 12,755,193 B2
(45) Date of Patent: Oct. 6, 2026

(54) ENHANCED MODEL EXPLANATIONS USING DYNAMIC TOKENIZATION FOR ENTITY MATCHING MODELS

(71) Applicant: SAP SE, Walldorf (DE)

(72) Inventors: Sundeep Gullapudi, Singapore (SG); Rajesh Vellore Arumugam, Singapore (SG); Abhinandan Padhi, Singapore (SG)

(73) Assignee: SAP SE, Walldorf (DE)

( * ) Notice: Subject to any disclaimer, the term of this patent is extended or adjusted under 35 U.S.C. 154(b) by 768 days.

(21) Appl. No.: 18/070,598

(22) Filed: Nov. 29, 2022

(65) Prior Publication Data

US 2024/0177053 A1 May 30, 2024

(51) Int. Cl.

| | |
|---|---|
| ***G06N 20/00*** | (2019.01) |
| ***G06F 40/284*** | (2020.01) |
| ***G06F 40/40*** | (2020.01) |
| ***G06N 3/02*** | (2006.01) |
| ***G06N 3/08*** | (2023.01) |

(52) U.S. Cl.

CPC ........... *G06N 20/00* (2019.01); *G06F 40/284* (2020.01); *G06F 40/40* (2020.01); *G06N 3/02* (2013.01); *G06N 3/08* (2013.01)

(58) Field of Classification Search

CPC . G06N 20/00; G06N 3/08; G06N 3/02; G06F 40/284; G06F 40/40; G06F 16/248

See application file for complete search history.

(56) References Cited

U.S. PATENT DOCUMENTS

| | | | | |
|---|---|---|---|---|
| 11,461,415 | B2 * | 10/2022 | Lu | G06F 40/284 |
| 12,254,878 | B1 * | 3/2025 | Rottmann | G10L 15/26 |
| 2020/0065710 | A1 * | 2/2020 | Range | G06F 16/9024 |
| 2020/0193511 | A1 | 6/2020 | Saito et al. | |
| 2021/0232613 | A1 * | 7/2021 | Raval Contractor | G06N 5/02 |
| 2021/0248192 | A1 * | 8/2021 | Lu | G06F 40/284 |
| 2023/0146336 | A1 * | 5/2023 | Wang | G06N 3/045 705/26.1 |
| 2024/0220730 | A1 * | 7/2024 | Meng | G06F 40/30 |

OTHER PUBLICATIONS

U.S. Appl. No. 17/452,441, filed Oct. 27, 2021, Arumugam et al.
U.S. Appl. No. 17/455,046, filed Nov. 16, 2021, Gullapudi.

(Continued)

*Primary Examiner* — Pinkal R Chokshi
(74) *Attorney, Agent, or Firm* — Fish & Richardson P.C.

(57) ABSTRACT

Methods, systems, and computer-readable storage media for receiving query data representative of query entities and target data representative of target entities, determining, by an attention ML model, a set of character-level embeddings, providing, by a sub-word-level tokenizer, a set of sub-word-level tokens, each sub-word-level token including a string of multiple characters, generating, by the attention ML model, a set of sub-word-level embeddings based on the set of sub-word-level tokens, providing, by the attention ML model, at least one attention matrix including attention scores, each attention score representative of a relative importance of a respective sub-word-level token in a predicted match, the predicted match including a match between a query entity and a target entity, and outputting an explanation based on the at least one attention matrix.

20 Claims, 7 Drawing Sheets

(56) References Cited

OTHER PUBLICATIONS

U.S. Appl. No. 17/646,886, filed Jan. 4, 2022, Gullapudi et al.
U.S. Appl. No. 17/646,889, filed Jan. 4, 2022, Gullapudi et al.
U.S. Appl. No. 17/647,477, filed Jan. 10, 2022, Nguyen et al.
U.S. Appl. No. 17/723,586, filed Apr. 19, 2022, Gullapudi et al.
U.S. Appl. No. 17/817,388, filed Aug. 4, 2022, Nguyen et al.
Frye et al., "Shapley explainability on the data manifold." arXiv preprint arXiv:2006.01272v4, Dec. 2021, 14 pages.
Lundberg et al., "A unified approach to interpreting model predictions." Advances in neural information processing systems 30, Nov. 2017, 10 pages.
Parikh et al., "A decomposable attention model for natural language inference." Proceedings of the 2016 Conference on Empirical Methods in Natural Language Processing, Nov. 2016, 2249-2255.
Schuster et al., "Japanese and Korean voice search." 2012 IEEE international conference on acoustics, speech and signal processing (ICASSP). IEEE, Mar. 2012, 5149-5152.

* cited by examiner

ENHANCED MODEL EXPLANATIONS USING DYNAMIC TOKENIZATION FOR ENTITY MATCHING MODELS

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task).

Predictions made by ML models can be profound and, in some cases, even deemed essential to activities of users. Because ML models are black-box (e.g., to non-technical users, to users that are uninformed on the development of the ML model), most users only receive the prediction output by the ML model without knowing how the prediction is made. When it comes to critical issues (e.g., medical diagnosis, investment decisions), predictions made by ML models may not be adopted by users. For example, because a user does not understand how and/or why the ML model made the particular prediction, the user might not adopt the prediction. Consequently, with the advent of ML models and AI-based technologies, a trust problem has arisen in users (particularly non-technical users) trusting output of the ML models.

In view of this problem stemming from the development and adoption of AI-based technologies, techniques have been developed to provide insight into how/why predictions are made by the ML models. For example, so-called explainable AI (XAI) has been developed to make the black-box of AI more transparent and understandable. In general, XAI refers to methods and techniques in the application of AI to enable results being more understandable to users, and can include providing reasoning for computed predictions and presenting predictions in an understandable and reliable way.

However, existing technologies for XAI have some deficiencies. For example, it is still difficult for un-trained, non-professional (e.g., users not versed in the particular subject matter that the ML model is applied to), and/or non-technical users (e.g., users not versed in the development, training, and the like of ML models) to understand the result as presented by the XAI. That is, the trust problem between users and AI differs across the spectrum of users. For example, XAI may output natural language descriptions and/or indicators indicating why the prediction result is made and/or what the key features are in the data that affect the prediction result. However, for non-professional users and/or non-technical users the output of the XAI is still not transparent or understandable. That is, for certain users, the XAI output is still too ambiguous to instill trust in whether the prediction is good and/or reliable. Without understanding the meaning of the prediction result, it can be difficult for some users to adopt the prediction and execute actions based on the prediction. Accordingly, there is a need to improve XAI and provide intelligible and usable interpretations and/or explanations of AI-technology predictions for a broader range of users

SUMMARY

Implementations of the present disclosure are directed to a machine learning (ML) system for matching entities. More particularly, implementations of the present disclosure are directed to a ML system that matches entities and, for each match, uses dynamic tokenization to provide an explanation that is representative of a reason for the match.

In some implementations, actions include receiving query data and target data, the query data representative of query entities and the target data representative of target entities, determining, by an attention ML model, a set of character-level embeddings based on the query data and the target data, providing, by a sub-word-level tokenizer, a set of sub-word-level tokens from the query data and the target data, each sub-word-level token including a string of multiple characters, generating, by the attention ML model, a set of sub-word-level embeddings based on the set of sub-word-level tokens, providing, by the attention ML model, at least one attention matrix including, for at least a sub-set of sub-word-level tokens, attention scores, each attention score representative of a relative importance of a respective sub-word-level token in a predicted match provided by a matching ML model, the predicted match including a match between a query entity and a target entity, and outputting an explanation including a query text string representative of the query entity and a target text string representative of the target entity, the query text string and the target text string being provided based on the at least one attention matrix. Other implementations of this aspect include corresponding systems, apparatus, and computer programs, configured to perform the actions of the methods, encoded on computer storage devices.

These and other implementations can each optionally include one or more of the following features: generating, by the attention ML model, a set of sub-word-level embeddings based on the set of sub-word-level tokens includes, for each sub-word level token in the set of sub-word-level tokens, identifying a sub-set of character-level embeddings from the set of character-level embeddings, each character-level embedding representative of a character included in the sub-word-level token, and aggregating values of respective dimensions across the character-level embeddings in the sub-set of character-level embeddings to provide a sub-word-level embedding for the sub-word-level token; aggregating includes determining one of a mean and a weighted mean of the values of respective dimensions using a mean pooling layer of the attention ML model; the query text string includes at least a portion of a feature of the query entity and the target text string includes at least a portion of a feature of the target entity; the attention ML model includes a decomposable attention component that generates the at least one attention matrix at least a sub-set of sub-word-level embeddings corresponding to sub-word-level tokens in the at least a sub-set of sub-word-level tokens; the explanation is generated by comparing attention scores of the attention matrix to a threshold attention score; and at least a portion of the attention ML model is provided from the matching ML model after the matching ML model has been trained.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
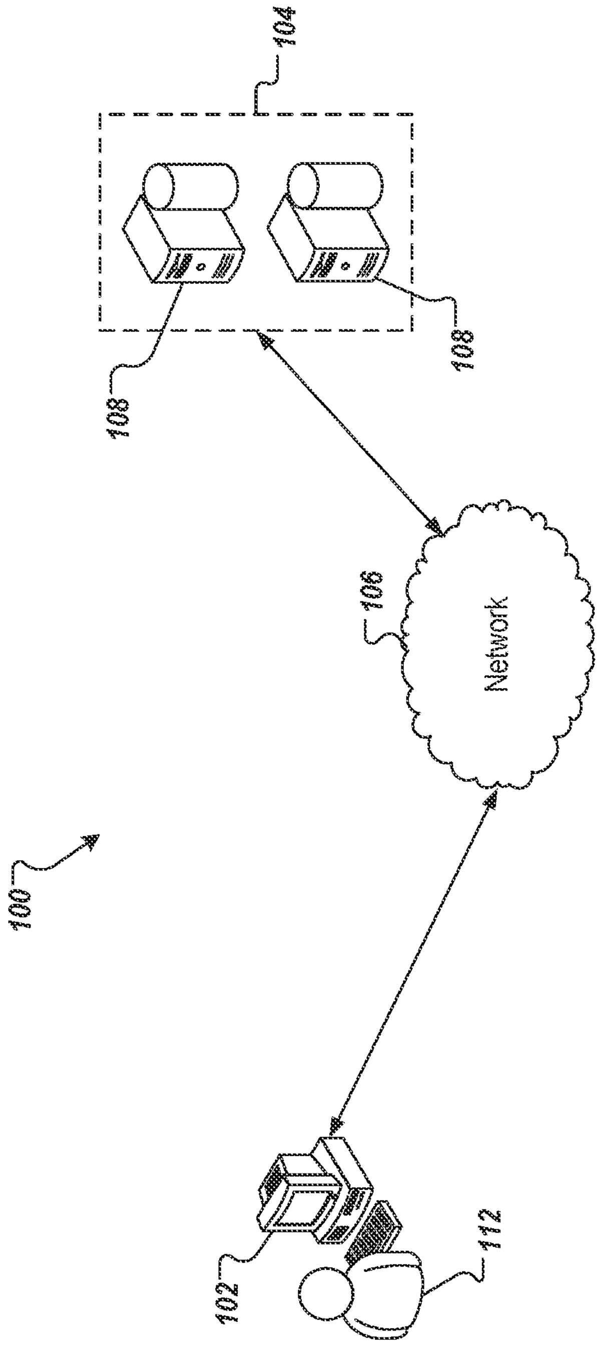
FIG. 1 depicts an example architecture that can be used to execute implementations of the present disclosure.

Implementations of the present disclosure are directed to a machine learning (ML) system for matching entities. More particularly, implementations of the present disclosure are directed to a ML system that matches entities and, for each match, uses dynamic tokenization to provide an explanation that is representative of a reason for the match.

Implementations can include actions of receiving query data and target data, the query data representative of query entities and the target data representative of target entities, determining, by an attention ML model, a set of character-level embeddings based on the query data and the target data, providing, by a sub-word-level tokenizer, a set of sub-word-level tokens from the query data and the target data, each sub-word-level token including a string of multiple characters, generating, by the attention ML model, a set of sub-word-level embeddings based on the set of sub-word-level tokens, providing, by the attention ML model, at least one attention matrix including, for at least a sub-set of sub-word-level tokens, attention scores, each attention score representative of a relative importance of a respective sub-word-level token in a predicted match provided by a matching ML model, the predicted match including a match between a query entity and a target entity, and outputting an explanation including a query text string representative of the query entity and a target text string representative of the target entity, the query text string and the target text string being provided based on the at least one attention matrix.

Implementations of the present disclosure are described in further detail with reference to an example problem space that includes the domain of finance and matching bank statements to invoices. More particularly, implementations of the present disclosure are described with reference to the problem of, given a bank statement (e.g., a computer-readable electronic document recording data representative of a bank statement), enabling an autonomous system using a ML model to determine one or more invoices (e.g., computer-readable electronic documents recording data representative of one or more invoices) that are represented in the bank statement. It is contemplated, however, that implementations of the present disclosure can be realized in any appropriate problem space.

Implementations of the present disclosure are also described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP AI Core) to learn accounting activities and to capture rich detail of customer and country-specific behavior. An example accounting activity can include matching payments indicated in a bank statement to invoices for clearing of the invoices. For example, using an enterprise platform (e.g., SAP S/4 HANA), incoming payment information (e.g., recorded in computer-readable bank statements) and open invoice information are passed to a matching engine, and, during inference, one or more ML models predict matches between records of a bank statement and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an autonomous system that uses a ML model to match entities. That is, the server system 104 can receive computer-readable electronic documents (e.g., bank statement, invoice table), and can match entities within the electronic document (e.g., a bank statement) to one or more entities in another electronic document (e.g., invoice table). In some examples, the server system 104 includes a ML platform that provides and trains a ML model, as described herein.

Figure 2:
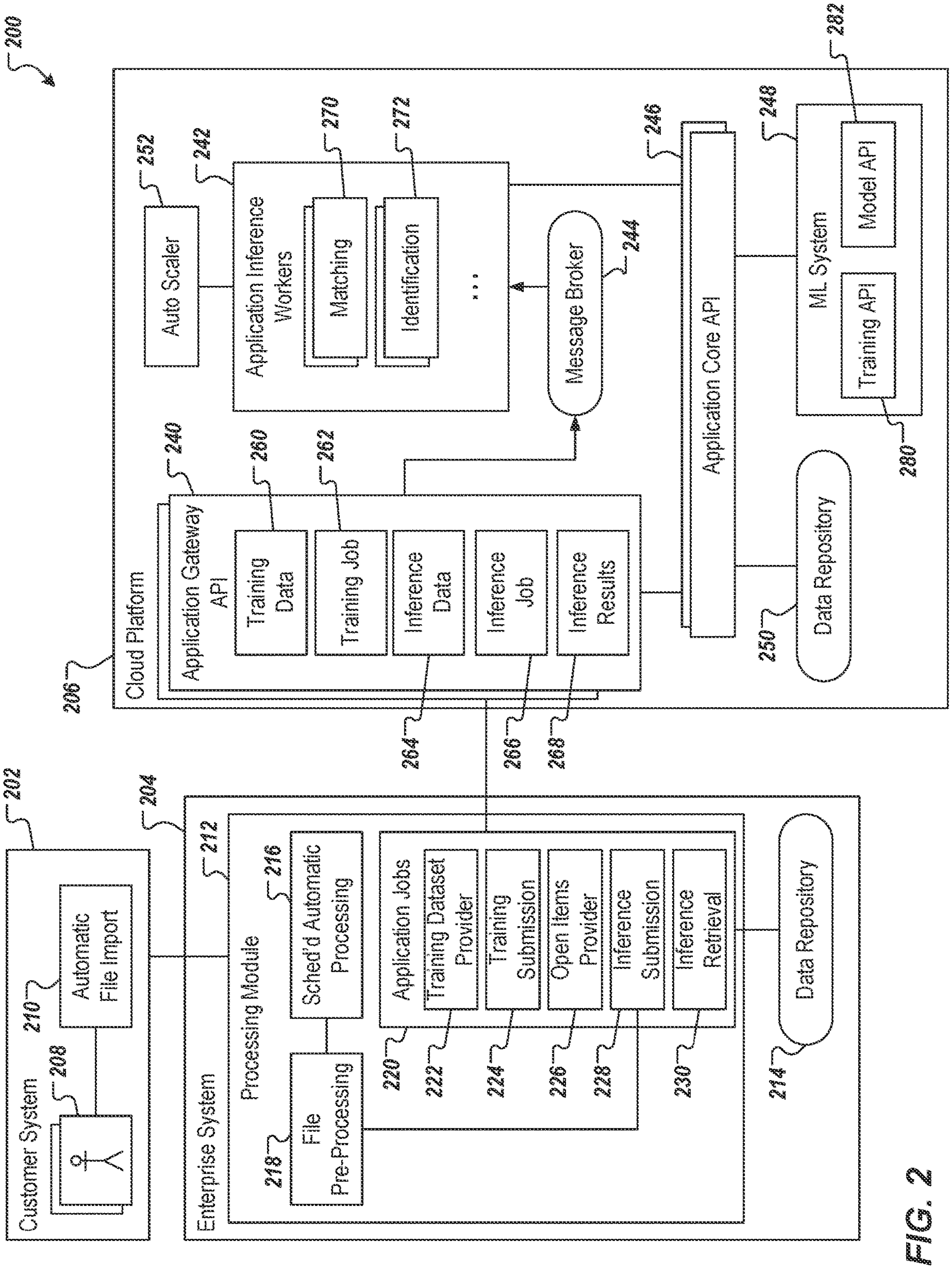
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a customer system 202, an enterprise platform 204 (e.g., SAP S/4 HANA) and a cloud platform 206 (e.g., SAP Cloud Platform (Cloud Foundry)). As described in further detail herein, the enterprise platform 204 and the cloud platform 206 facilitate one or more ML applications that leverage ML models to provide functionality for one or more enterprises. In some examples, each enterprise interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise platform 204 for processing by a ML application. For example, and in the context of CashApp, an invoice data file and a bank statement data file can be imported to the enterprise platform 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise platform 204 includes a processing module 212 and a data repository 214. In the context of CashApp, the processing module 212 can include a finance-accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction, also referred to herein as an inference result. In the context of CashApp, the training data can include invoice to bank statement matches as examples provided by a customer, which training data is used to train a ML model to predict invoice to bank statement matches. Also in the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264 (e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 262. In response, the application gateway API 240 sends a training request to the ML system 248 through the application core API 246. By way of non-limiting example, the ML system 248 can be provided as SAP AI Core. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 266. In some examples, the auto-scaler 252 functions to scale the inference workers up/down depending on the number of inference jobs submitted to the cloud platform 206.

To provide further context for implementations of the present disclosure, and as introduced above, the problem of matching entities represented by computer-readable records (electronic documents) appears in many contexts. Example contexts can include matching product catalogs, deduplicating a materials database, and matching incoming payments from a bank statement table to open invoices, the example context introduced above.

Figure 3:
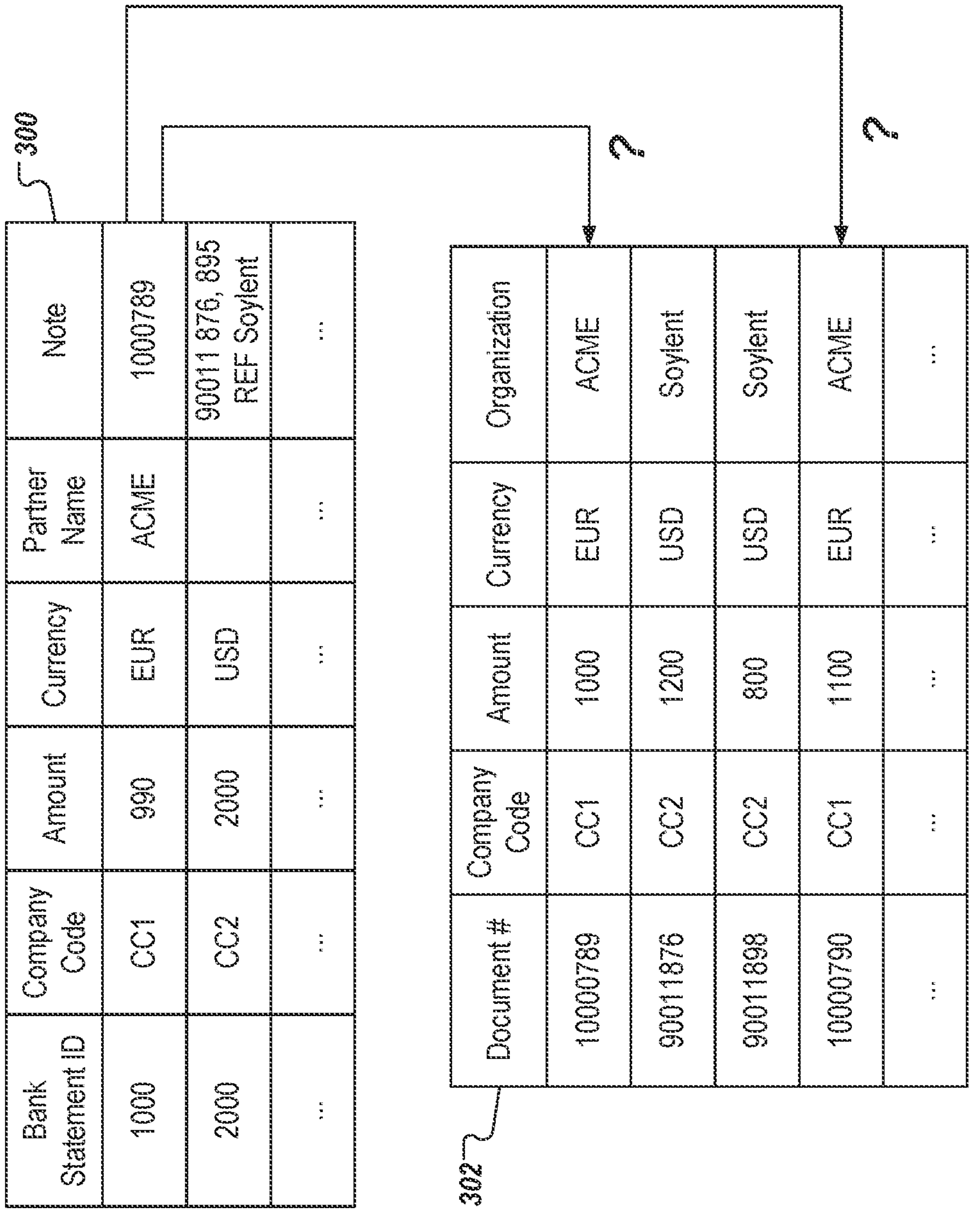
FIG. 3 depicts portions of example electronic documents.

In the example context, FIG. 3 depicts portions of example electronic documents. In the example of FIG. 3, a first electronic document 300 includes a bank statement table that includes records representing payments received, and a second electronic document 302 includes an invoice table that includes invoice records respectively representing invoices that had been issued. In the example context, each bank statement record is to be matched to one or more invoice records. Accordingly, the first electronic document 300 and the second electronic document 302 are processed using one or more ML models that provide predictions regarding matches between a bank statement record (entity) and one or more invoice records (entity/-ies) (e.g., using CashApp, as described above).

To achieve this, a ML model (matching model) is provided as a classifier that is trained to predict entity pairs to a fixed set of class labels ($\vec{l}$) (e.g., $l_0$, $l_1$, $l_2$). For example, the set of class labels ($\vec{l}$) can include 'no match' ($l_0$), 'single match' ($l_1$), and 'multi match' ($l_2$). In some examples, the ML model is provided as a function $f$ that maps a query entity ($\vec{a}$) and a target entity ($\vec{b}$) into a vector of probabilities ($\vec{p}$) (also called 'confidences' in the deep learning context) for the labels in the set of class labels. This can be represented as:

$$f(\vec{a}, \vec{b}) = \begin{pmatrix} p_0 \\ p_1 \\ p_2 \end{pmatrix}$$

where $\vec{p}=\{p_0, p_1, p_2\}$. In some examples, $p_0$ is a prediction probability (also referred to herein as confidence c) of the item pair $\vec{a}$, $\vec{b}$ belonging to a first class (e.g., no match), $p_1$ is a prediction probability of the item pair $\vec{a}$, $\vec{b}$ belonging to a second class (e.g., single match), and $p_2$ is a prediction probability of the item pair $\vec{a}$, $\vec{b}$ belonging to a third class (e.g., multi match).

Here, $p_0$, $p_1$, and $p_2$ can be provided as numerical values indicating a likelihood (confidence) that the item pair $\vec{a}$, $\vec{b}$ belongs to a respective class. In some examples, the ML model can assign a class to the item pair $\vec{a}$, $\vec{b}$ based on the values of $p_0$, $p_1$, and $p_2$. In some examples, the ML model can assign the class corresponding to the highest value of $p_0$, $p_1$, and $p_2$. For example, for an entity pair $\vec{a}$, $\vec{b}$, the ML model can provide that $p_0=0.13$, $p_1=0.98$, and $p_2=0.07$. Consequently, the ML model can assign the class 'single match' ($l_1$) to the item pair $\vec{a}$, $\vec{b}$.

For this pair-wise matching problem, one objective during the prediction is to understand why the ML model has predicted each particular match. This can be achieved by explainability, such as XAI, which is important in various contexts. For example, applications of ML models, such as CashApp, can be associated with sensitive data (e.g., financial data). In some such scenarios, auditing is required for each decision performed based on the sensitive data. Explainability helps to provide a meaningful explanation as to why the ML model has performed a match between data sets (e.g., an invoice and a payment or bank statement item). Explanations are not always specific to the sensitive data, understanding ML model predictions is required for the particular applications as well. As another example, explainability helps to understand the behavior of the ML model and, for example, improve tuning of hyper-parameters to improve the ML model itself (e.g., improve accuracy). If, for example, the ML model is not achieving a desired accuracy, analysis is performed on the data inputs that the ML model predictions are incorrect for. Based on the explanations, an understanding can be achieved as to which features/data tokens are helping the ML model to accurately predict a match or not. Based on this analysis, adversarial data can be provided and used to improve the ML model.

In some traditional approaches to explainability, a Shapley Additive Explanations (SHAP) explainer is used determine the most influential data attributes (features) of each of a target entity and a query entity for a match prediction made by the ML model. The SHAP explainer does this by turning off one feature at a time and assessing its effects on the prediction. Disabling important features would drastically change the prediction, suggesting that such features have high weightage. In cases where it is known that the ML model is incorrect (based on the ground-truth), an explanation can be provided based on the features identified by the SHAP explainer. The SHAP explainer, however, is computationally intensive and is impractical for datasets that include a relatively large set of features (e.g., 10 or more features). In some domains, such as pair-wise entity matching, there are frequently more than 10 features used to determine matches. In such cases, the runtime performance of the SHAP explainer is sub-optimal, being inefficient in term so both time and resources.

In some traditional approaches to explainability, a decomposable attention model explainer (attention model or attention explainer) can be used, which includes an attention mechanism to assign weights to pairs of features between the query and target entities. For example, and with non-limiting reference to CashApp, the input to the attention explainer is the character sequence for certain pre-determined features in the data for both a query (bank statement) and a target (invoice) of an entity pair. This means that, for each string-valued feature in the query/target data, the strings are converted to character sequences, and an attention operation takes place between the query and target.

In some examples, the attention operation involves taking the dot product of the query and target sequence to generate an attention matrix. The purpose of the attention matrix is to assign weights to each pair of query-target features, so that it can be determined which features and tokens the ML model pays most attention to and considers most significant during a prediction. In theory, the attention explainer is better than a SHAP explainer, because the significant tokens can be more time- and resource-efficiently determined. These tokens, however, are character-level tokens, which limits the usefulness of the attention-based explanations.

For example, the attention matrix is generated from pairs of long character sequences, such that the output is a sequence of scores for each pair of characters in the query and target text features. When applying a threshold to the character-level attention scores to output relevant sub-strings, it has been observed that the sub-strings that are output consist of individual characters scattered throughout the character sequence. An explanation that is made up of scattered characters in the text features is not particularly meaningful. As another example, the order of the matching characters in the query and target sequences may be inconsistent. For example, if a character “E” is found matching between the query and target, the location of this “E” in the sub-strings could be random—at the beginning of the string, somewhere in the middle, or at the end, especially for common characters. Hence, the locations of matching characters could be random and meaningless, limiting how useful the explanations are. As another example, the attention explainer is also unable to assign weights to text features as accurately as the SHAP explainer. Consequently, using the attention explainer standalone may generate less accurate explanations than the SHAP explainer.

In some traditional approaches, the attention explainer and the SHAP explainer can be used together as a so-called composite explainer. For example, the attention explainer generates relevant sub-strings and the top query-target feature pairs it determines are passed to the SHAP explainer to assign weights to the feature pairs. During the training phase, the query string and the target string are tokenized at the character level and the ML model, which predicts matches, is trained. For the prediction phase (inference), an attention model is provided as a set of attention layers of the (matching) ML model (e.g., the attention model is a sub-model of the ML model). For query and target pairs, a match is predicted by the ML model, and attention scores are determined using the attention model. A threshold is used to identify the best features of each query and target pair. These features are provided as an input to the SHAP explainer, which calculated feature importance for each feature. However, and as noted above, the SHAP explainer is inefficient in term of time and resources consumed in cases with a relatively high number of features.

While weights can be assigned more accurately, this two-stage composite explainer is exceedingly complex and time-consuming. Consequently, the composite explainer is slow and sub-optimal, reducing ML model performance in terms of time and resources consumed. Further, the explanations that are output have limited use. For example, Table 1 represents sample output of a composite explainer:

TABLE 1

Example Explanations for Example Matches (Composite Explainer)

| Match | Query Text | Target Text |
|---|---|---|
| 1 | ..........A...R.........O...C......... | C.................A...R.................. |
| 2 | .. | .. |
| 3 | ..............T................E......... | .....T............. |

In the example of Table 1, the query text and the target text are meant as the explanations to provide insight as to why the ML model made a respective match between a query entity and target entity pair. As can be seen in Table 1, the usefulness of the explanations is limited.

In view of the above context, implementations of the present disclosure provide a ML system that matches entities and, for each match, uses dynamic sub-word-level tokenization to provide an explanation that is representative of a reason for the match. As described in further detail herein, the ML system of the present disclosure overcomes drawbacks of the character-level explanations output by, for example, an attention explainer as discussed above. As described in further detail herein, the ML system of the present disclosure improves the quality of explanations output by an attention explainer to the point that a SHAP explainer can be foregone. In this manner, the ML system of the present disclosure also overcomes drawbacks of using a two-stage composite explainer, for example.

In accordance with implementations of the present disclosure, the ML system generates explanations using sub-word level tokenization. More particularly, and as described in further detail herein, the ML system of the present disclosure includes a first ML model (matching model) that predicts matches between entities, and a second ML model (attention model) that provides an attention matrix to generate explanations. In some examples, the first ML model is provided using character-level tokenization, as in traditional approaches. In some examples, the second ML model is provided as a sub-model of the first ML model, after the first ML model has been trained. For example, the second ML model is constructed by using few layers like input layers and attention layer as the output layer of the first ML model (e.g., a copy of attention layers). As described in further detail herein, sub-word level tokenization is injected into the second ML model to provide explanations for matches predicted by the first ML model.

In some examples, sub-word-level tokenization can be described as a tokenization that is between character-level tokenization and word-level tokenization. For example, character-level tokenization provides a token for each character in strings of characters and word-level tokenization provides a token for each word included in a string of characters. In contrast, sub-word level tokenization splits an input text sequence (strings of characters) into sub-words (or sub-strings) that each include multiple characters. In some examples, a sub-word can be described as a portion of a word (e.g., ‘comp’ is a sub-word of the word ‘company’). The main idea behind sub-word-level tokenization is that it can resolve issues arising in word-based tokenization (e.g., relatively large vocabulary size, relatively larger number of out-of-vocabulary tokens, different meaning of very similar words) and in character-level tokenization (e.g., relatively long sequences, less meaningful individual tokens).

Example sub-word-level tokenizers include, without limitation, Byte-Pair Encoding (BPE), WordPiece, and SentencePiece. Implementations of the present disclosure are described in further detail herein with reference to WordPiece. However, it is contemplated that implementations of the present disclosure can be realized using any appropriate sub-word-level tokenizer. WordPiece uses a transformer-based natural language processing (NLP) model referred to as Bi-directional Encoder Representations from Transformers (BERT).

In some implementations, the ML system of the present disclosure can include a first ML sub-system and a second ML sub-system. As described in further detail herein, the first ML sub-system includes the first ML model that is provided using character-level tokenization and provides match predictions for query entity and target entity pairs.

The second ML sub-system includes the second ML model using sub-word-level tokenization to provide an explanation for each match prediction provided from the first ML model.

Figure 4A:
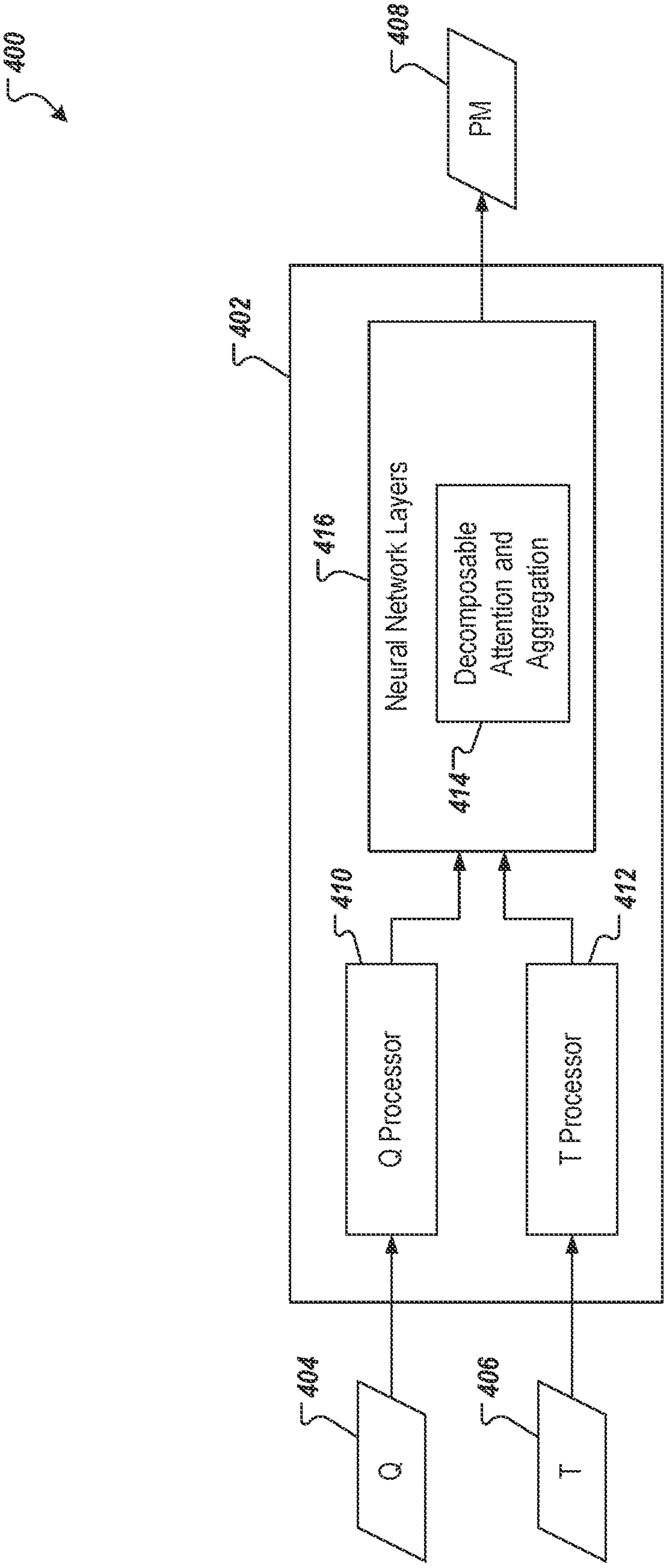
FIG. 4A depicts a schematic representation of a first machine learning (ML) sub-system for matching entities in accordance with implementations of the present disclosure.

FIG. 4A depicts a schematic representation of a first ML sub-system 400 for matching entities in accordance with implementations of the present disclosure. In the example of FIG. 4A, the first ML sub-system 400 includes a first ML model 400 (matching model) that receives query data 404 representative of query entities and target data 406 representative of target entities and determines predicted matches 408 for respective target entity and query entity pairs (e.g., no match, single match, multi-match). In the example of FIG. 4A, the first ML model 402 includes a query data processor 410, a target data processor 412, a decomposable attention and aggregation component 414 included in neural network layers 416.

In some implementations, the query data 404 includes a set of features for each query entity (e.g., strings of characters of the query entity) and the target data 406 includes a set of features for each target entity (e.g., strings of characters of the target entity). The query data processor 410 provides query string embeddings from the query data 404 and the target data processor 412 provides target string embeddings for the target data 406. In some examples, the query string embeddings and the target string embeddings are each character-level embeddings, meaning that an embedding is provided for each character in a respective string, each embedding being a multi-dimensional vector representation of an individual character. The query string embeddings and the target string embeddings are processed through the decomposable attention and aggregation component 414, which provides output to the neural network layers 416, which outputs the predicted matches 408.

Figure 4B:
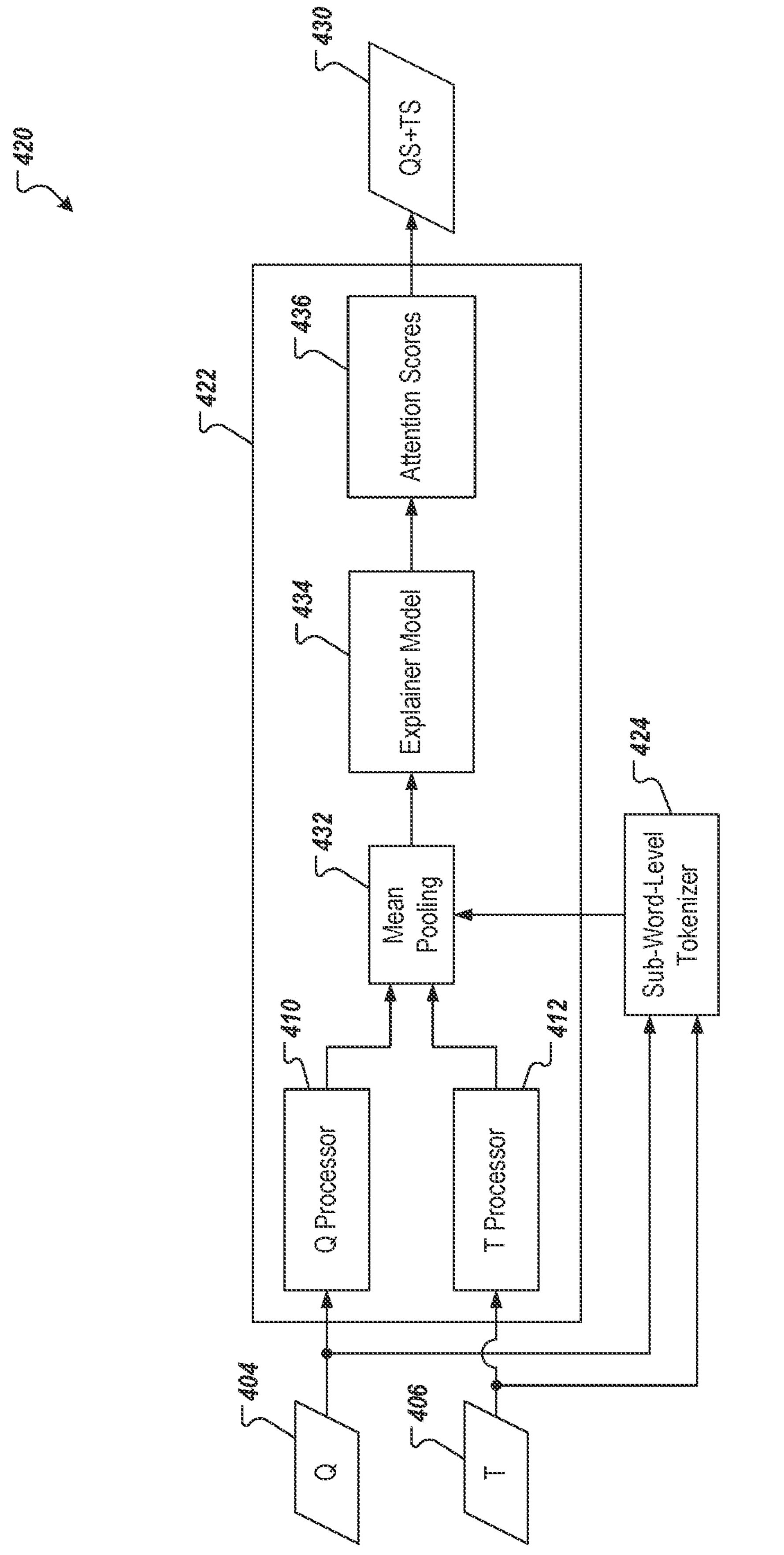
FIG. 4B depicts a schematic representation of a second ML sub-system for generating explanations in accordance with implementations of the present disclosure.

FIG. 4B depicts a schematic representation of a second ML sub-system 420 for generating explanations in accordance with implementations of the present disclosure. In the example of FIG. 4B, the second ML sub-system 420 includes a second ML model 422 (attention model) and a sub-word-level tokenizer 424. In some examples, the second ML model 422 receives the query data 404 representative of query entities and the target data 406 representative of target entities and sub-word-level tokens from the sub-word-level tokenizer 424, and determines explanation text 430 for the target entity and query entity pair. In the example of FIG. 4B, the second ML model 422 includes the query data processor 410, the target data processor 412, a mean pooling layer 432, an explainer model 434 (which includes a decomposable attention component), and an attention scores component 436. As discussed above, at least a portion of the second ML model 422 is provided from the first ML model 402 of FIG. 4A, after the first ML model 402 has been trained. For example, the query data processor 410 and the target data processor 412 are taken from the first ML model 402.

As discussed above, in some implementations, the query data 404 includes a set of features for each query entity (e.g., strings of characters of the query entity) and the target data 406 includes a set of features for each target entity (e.g., strings of characters of the target entity). The query data processor 410 provides query string embeddings from the query data 404 and the target data processor 412 provides target string embeddings from the target data 406. In some examples, the query string embeddings and the target string embeddings are each character-level embeddings, meaning that an embedding is provided for each character in a respective string, each embedding being a multi-dimensional vector representation of an individual character. In accordance with implementations of the present disclosure, the sub-word-level tokenizer 424 receives the query data 404 and the target data 406 and provides a set of sub-word-level tokens for the query entity and the target entity. Each sub-word-level token is provided as a multi-character string (e.g., two or more characters). In general, the set of sub-word level tokens can be described as a library of multi-character strings present in the query entities and the target entities. In some examples, the sub-word-level tokenizer 424 is provided as a BERT model tokenizer (e.g., WordPiece). In accordance with implementations of the present disclosure, the sub-word-level tokenization is dynamic. For example, a set sub-word-level tokens (library) is generated for each query data 404 and target data 406 that is input to the ML system.

In some implementations, the query string embeddings, the target string embeddings, and the set of sub-word-level tokens are processed through the mean pooling layer 432 to provide sub-word level embeddings. In some examples, for each sub-word-level token in the set of sub-word-level tokens, the mean pooling layer 432 determines a sub-word-level embedding by determining a mean of the character-level embeddings across all characters in the sub-word-level token.

For example, and without limitation, the following character-level embeddings can be provided:

*a*: [0.4, 0.5, . . . , 0.5]

*b*: [0.4, 0.3, . . . , 0.9]

*c*: [0.3, 0.5, . . . , 0.2]

. . .

*m*: [0.7, 0.4, . . . , 0.5]

*n*: [0.6, 0.5, . . . , 0.5]

*o*: [0.1, 0.7, . . . , 0.6]

*p*: [1.2, 0.6, . . . , 0.8

. . .

In this example, the set of sub-word-level tokens can include 'par' and 'comp' among several others. In some examples, a sub-word-level embedding for the sub-word-level token 'par' can be provided as [0.37, 0.43, . . . , 0.53] and a sub-word-level embedding for the sub-word-level token 'comp' can be provided as [0.77, 0.31, . . . , 0.7]. Accordingly, each sub-word-level embedding is identical in vector dimension to the character-level embeddings.

In some implementations, the sub-word-level embeddings are provided as input to the explainer model 434, which provides output to the attention scores component 436, which outputs, for each predicted match 408, a query string and a target string as the explanation text 430 that collectively represents an explanation as to why the respective predicted match 408 was determined. In some examples, the decomposable attention layer in the explainer model 434 provides an attention matrix that includes an attention score for each sub-word-level token in the set of sub-word-level tokens based on the respective sub-word-level embeddings, each attention score indicating a relative importance in a respective sub-word-level token in determining the predicted match 408. In some examples, the attention matrix is specific to each predicted match 408. For example, given the query and the target as the input, an attention matrix is provided.

In some examples, the attention scores component 436 compares each attention score to a threshold attention score. If an attention score meets or exceeds the threshold attention score, the respective sub-word-level token is included in the explanation text 430. If an attention score does not meet or exceed the threshold attention score, the respective sub-word-level token is not included in the explanation text 430.

As described herein, implementations of the present disclosure provide one or more improvements over traditional approaches to explainability in the domain of pair-wise entity matching. For example, implementations of the present disclosure provide improvements in time- and resource-efficiency in generating explanations. Further, implementations of the present disclosure provide more detailed explanations that more clearly provide reasons for a respective predicted match. For example, Table 2 represents sample output of a composite explainer:

TABLE 2

Example Explanations for Example Matches (Present Disclosure)

| Match | Query Text | Target Text |
|---|---|---|
| 1 | ..../....OF.CU....6030023236...205... | 6030023236 |
| 2 | ..../..6681001470.HOU...IN....1714.. | 6681001470 |
| 3 | /.../../...AUCKLANDCOUNCIL..IN.. | AUCKLANDCOUNCIL |

As represented in the examples of Table 2, explanations generated using the ML system of the present disclosure are more indicative of reasons for matches as compared to those of traditional approaches, as represented in the examples of Table 1. Further, implementations of the present disclosure achieve this in a more time- and resource-efficient manner. For example, another computationally components, such as a SHAP explainer, can be foregone.

Figure 5:
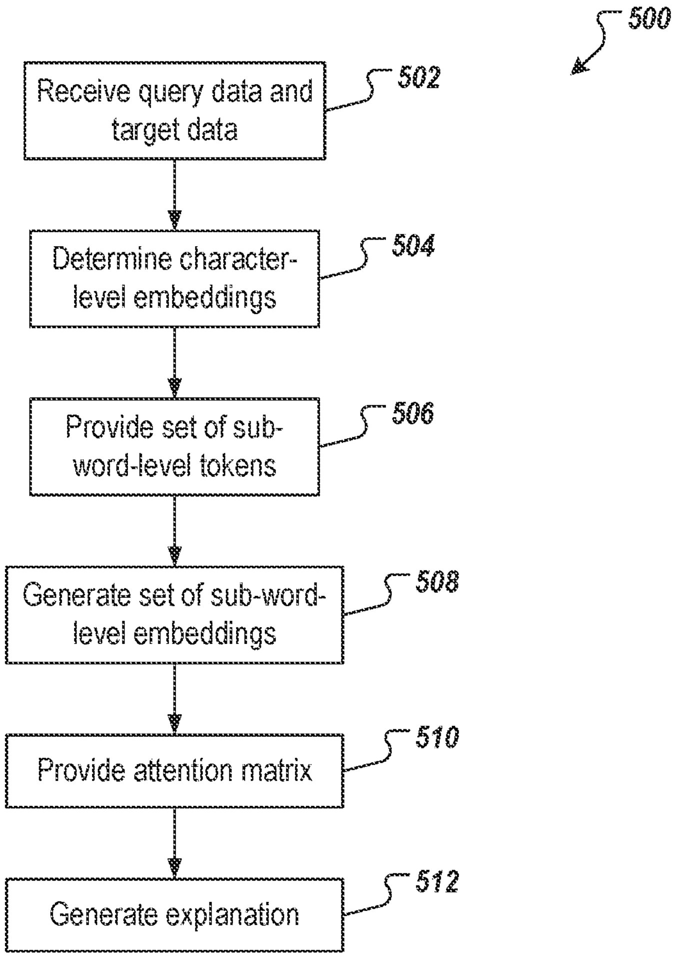
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

Query data and target data are received (502). For example, and as described in detail herein with reference to FIG. 4B, the query data processor 410 receives the query data 404 and the target data processor 412 receives the target data 406. The query data 404 includes a set of features for each query entity (e.g., strings of characters of the query entity) and the target data 406 includes a set of features for each target entity (e.g., strings of characters of the target entity). Character-level embeddings are determined (504). For example, and as described in detail herein, the query data processor 410 provides query string embeddings from the query data 404 and the target data processor 412 provides target string embeddings from the target data 406. In some examples, the query string embeddings and the target string embeddings are each character-level embeddings, meaning that an embedding is provided for each character in a respective string, each embedding being a multi-dimensional vector representation of an individual character.

A set of sub-word-level tokens is provided (506). For example, and as described in detail herein, the sub-word-level tokenizer 424 receives the query data 404 and the target data 406 and provides a set of sub-word-level tokens for the query entity and the target entity. Each sub-word-level token is provided as a multi-character string (e.g., two or more characters). In general, the set of sub-word level tokens can be described as a library of multi-character strings present in the query entities and the target entities. In some examples, the sub-word-level tokenizer 424 is provided as a BERT model tokenizer (e.g., WordPiece). A set of sub-word-level embeddings is generated (508). For example, and as described in detail herein, the query string embeddings, the target string embeddings, and the set of sub-word-level tokens are processed through the mean pooling layer 432 to provide sub-word level embeddings. In some examples, for each sub-word-level token in the set of sub-word-level tokens, the mean pooling layer 432 determines a sub-word-level embedding by determining a mean of the character-level embeddings across all characters in the sub-word-level token.

An attention matrix is provided (510). For example, and as described in detail herein, the decomposable attention layer in the explainer model 434 provides an attention matrix that includes an attention score for each sub-word-level token in the set of sub-word-level tokens based on the respective sub-word-level embeddings, each attention score indicating a relative importance in a respective sub-word-level token in determining the predicted match 408. Explanations are generated (512). For example, and as described in detail herein, the attention scores component 436 compares each attention score to a threshold attention score. If an attention score meets or exceeds the threshold attention score, the respective sub-word-level token is included in the explanation text 430. If an attention score does not meet or exceed the threshold attention score, the respective sub-word-level token is not included in the explanation text 430.

Figure 6:
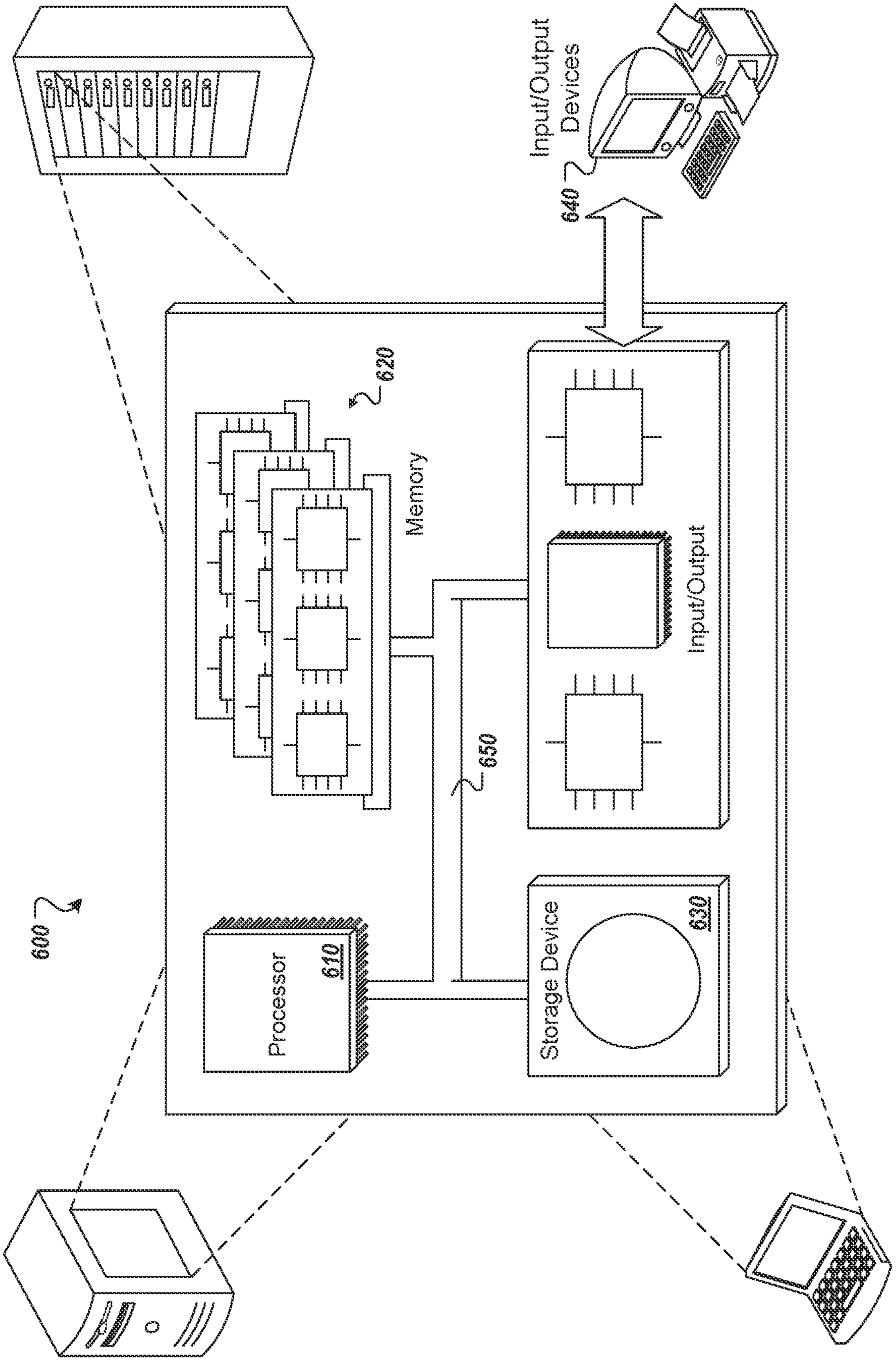
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing explanation text for predicted matches of query entities to target entities using machine learning (ML) models, the method being executed by one or more processors and comprising:

receiving query data and target data, the query data representative of a plurality of query entities of a query entity table and the target data representative of a plurality of target entities of a target entity table, the query entity table comprising rows, each row recording query data of a respective query entity, the target entity table comprising rows, each row recording target data of a respective target entity;

determining, by an attention machine learning (ML) model, a set of character-level embeddings based on the query data and the target data;

providing, by a sub-word-level tokenizer, a set of sub-word-level tokens from the query data and the target data, each sub-word-level token comprising a string of multiple characters;

generating, by the attention ML model, a set of sub-word-level embeddings based on the set of sub-word-level tokens;

providing, by the attention ML model, at least one attention matrix comprising, for at least a sub-set of sub-word-level tokens, attention scores, each attention score representative of a relative importance of a respective sub-word-level token in a predicted match of a set of predicted matches provided by a matching ML model, each predicted match in the set of predicted matches comprising a match between a query entity of the plurality of query entities and a target entity of the plurality of query entities, the set of predicted matches comprising a first predicted match as a single match that matches a first query entity to a first target entity and a second predicted match as a multi match that matches a second query entity to a second target entity and a third target entity; and outputting a set of explanations, each explanation corresponding to a query entity and target entity pair and comprising a query text string representative of a portion of a query entity of the query entity and target entity pair and a target text string representative of a portion of a target entity of the query entity and target entity pair that is found in the portion of the query entity, the query text string and the target text string of each explanation in the set of explanations being provided based on the at least one attention matrix.

2. The method of claim 1, wherein generating, by the attention ML model, a set of sub-word-level embeddings based on the set of sub-word-level tokens comprises, for each sub-word level token in the set of sub-word-level tokens:

identifying a sub-set of character-level embeddings from the set of character-level embeddings, each character-level embedding representative of a character included in the sub-word-level token; and aggregating values of respective dimensions across the character-level embeddings in the sub-set of character-level embeddings to provide a sub-word-level embedding for the sub-word-level token.

3. The method of claim 2, wherein aggregating comprises determining one of a mean and a weighted mean of the values of respective dimensions using a mean pooling layer of the attention ML model.

4. The method of claim 1, wherein the query text string comprises at least a portion of a feature of the query entity and the target text string comprises at least a portion of a feature of the target entity.

5. The method of claim 1, wherein the attention ML model comprises a decomposable attention component that generates the at least one attention matrix at least a sub-set of sub-word-level embeddings corresponding to sub-word-level tokens in the at least a sub-set of sub-word-level tokens.

6. The method of claim 1, wherein the explanation is generated by comparing attention scores of the attention matrix to a threshold attention score.

7. The method of claim 1, wherein at least a portion of the attention ML model is provided from the matching ML model after the matching ML model has been trained.

8. A non-transitory computer-readable storage medium coupled to one or more processors and having instructions stored thereon which, when executed by the one or more processors, cause the one or more processors to perform operations for providing explanation text for predicted matches of query entities to target entities using machine learning (ML) models, the operations comprising:

receiving query data and target data, the query data representative of a plurality of query entities of a query entity table and the target data representative of a plurality of target entities of a target entity table, the query entity table comprising rows, each row recording query data of a respective query entity, the target entity table comprising rows, each row recording target data of a respective target entity;

determining, by an attention machine learning (ML) model, a set of character-level embeddings based on the query data and the target data;

providing, by a sub-word-level tokenizer, a set of sub-word-level tokens from the query data and the target data, each sub-word-level token comprising a string of multiple characters;

generating, by the attention ML model, a set of sub-word-level embeddings based on the set of sub-word-level tokens;

providing, by the attention ML model, at least one attention matrix comprising, for at least a sub-set of sub-word-level tokens, attention scores, each attention score representative of a relative importance of a respective sub-word-level token in a predicted match of a set of predicted matches provided by a matching ML model, each predicted match in the set of predicted matches comprising a match between a query entity of the plurality of query entities and a target entity of the plurality of query entities, the set of predicted matches comprising a first predicted match as a single match that matches a first query entity to a first target entity and a second predicted match as a multi match that matches a second query entity to a second target entity and a third target entity; and outputting a set of explanations, each explanation corresponding to a query entity and target entity pair and comprising a query text string representative of a portion of a query entity of the query entity and target entity pair and a target text string representative of a portion of a target entity of the query entity and target entity pair that is found in the portion of the query entity, the query text string and the target text string of each explanation in the set of explanations being provided based on the at least one attention matrix.

9. The non-transitory computer-readable storage medium of claim 8, wherein generating, by the attention ML model, a set of sub-word-level embeddings based on the set of sub-word-level tokens comprises, for each sub-word level token in the set of sub-word-level tokens:

identifying a sub-set of character-level embeddings from the set of character-level embeddings, each character-level embedding representative of a character included in the sub-word-level token; and aggregating values of respective dimensions across the character-level embeddings in the sub-set of character-level embeddings to provide a sub-word-level embedding for the sub-word-level token.

10. The non-transitory computer-readable storage medium of claim 9, wherein aggregating comprises determining one of a mean and a weighted mean of the values of respective dimensions using a mean pooling layer of the attention ML model.

11. The non-transitory computer-readable storage medium of claim 8, wherein the query text string comprises at least a portion of a feature of the query entity and the target text string comprises at least a portion of a feature of the target entity.

12. The non-transitory computer-readable storage medium of claim 8, wherein the attention ML model comprises a decomposable attention component that generates the at least one attention matrix at least a sub-set of sub-word-level embeddings corresponding to sub-word-level tokens in the at least a sub-set of sub-word-level tokens.

13. The non-transitory computer-readable storage medium of claim 8, wherein the explanation is generated by comparing attention scores of the attention matrix to a threshold attention score.

14. The non-transitory computer-readable storage medium of claim 8, wherein at least a portion of the attention ML model is provided from the matching ML model after the matching ML model has been trained.

15. A system, comprising:

a computing device; and a computer-readable storage device coupled to the computing device and having instructions stored thereon which, when executed by the computing device, cause the computing device to perform operations for providing explanation text for predicted matches of query entities to target entities using machine learning (ML) models, the operations comprising:

receiving query data and target data, the query data representative of a plurality of query entities of a query entity table and the target data representative of a plurality of target entities of a target entity table, the query entity table comprising rows, each row recording query data of a respective query entity, the target entity table comprising rows, each row recording target data of a respective target entity;

determining, by an attention machine learning (ML) model, a set of character-level embeddings based on the query data and the target data;

providing, by a sub-word-level tokenizer, a set of sub-word-level tokens from the query data and the target data, each sub-word-level token comprising a string of multiple characters;

generating, by the attention ML model, a set of sub-word-level embeddings based on the set of sub-word-level tokens;

providing, by the attention ML model, at least one attention matrix comprising, for at least a sub-set of sub-word-level tokens, attention scores, each attention score representative of a relative importance of a respective sub-word-level token in a predicted match of a set of predicted matches provided by a matching ML model, each predicted match in the set of predicted matches comprising a match between a query entity of the plurality of query entities and a target entity of the plurality of query entities, the set of predicted matches comprising a first predicted match as a single match that matches a first query entity to a first target entity and a second predicted match as a multi match that matches a second query entity to a second target entity and a third target entity; and outputting a set of explanations, each explanation corresponding to a query entity and target entity pair and comprising a query text string representative of a portion of a query entity of the query entity and target entity pair and a target text string representative of a portion of a target entity of the query entity and target entity pair that is found in the portion of the query entity, the query text string and the target text string of each explanation in the set of explanations being provided based on the at least one attention matrix.

16. The system of claim 15, wherein generating, by the attention ML model, a set of sub-word-level embeddings based on the set of sub-word-level tokens comprises, for each sub-word level token in the set of sub-word-level tokens:

identifying a sub-set of character-level embeddings from the set of character-level embeddings, each character-level embedding representative of a character included in the sub-word-level token; and aggregating values of respective dimensions across the character-level embeddings in the sub-set of character-level embeddings to provide a sub-word-level embedding for the sub-word-level token.

17. The system of claim 16, wherein aggregating comprises determining one of a mean and a weighted mean of the values of respective dimensions using a mean pooling layer of the attention ML model.

18. The system of claim 15, wherein the query text string comprises at least a portion of a feature of the query entity and the target text string comprises at least a portion of a feature of the target entity.

19. The system of claim 15, wherein the attention ML model comprises a decomposable attention component that generates the at least one attention matrix at least a sub-set of sub-word-level embeddings corresponding to sub-word-level tokens in the at least a sub-set of sub-word-level tokens.

20. The system of claim 15, wherein the explanation is generated by comparing attention scores of the attention matrix to a threshold attention score.

* * * * *